United States Patent

Bilski et al.

[11] Patent Number: 6,045,692
[45] Date of Patent: Apr. 4, 2000

[54] OIL FILTER TO INTRODUCE ANTI-WEAR ADDITIVES INTO ENGINE LUBRICATING SYSTEM

[75] Inventors: Gerard Walter Bilski, Perrysburg; Charlie Probasco, New Paris; Robert Franklyn Voigt, Greenville, all of Ohio

[73] Assignee: AlliedSignal Inc., Morristown, N.J.

[21] Appl. No.: 08/833,563

[22] Filed: Apr. 7, 1997

Related U.S. Application Data

[62] Division of application No. 08/691,272, Aug. 1, 1996, Pat. No. 5,725,031.

[51] Int. Cl.[7] .................................................. B01D 27/00
[52] U.S. Cl. ...................... 210/198.1; 210/168; 210/209; 210/437; 210/440; 210/DIG. 17; 123/1 A; 123/196 A; 184/6.21; 184/6.24
[58] Field of Search ................. 210/168, 198.1, 210/209, 437, 440, DIG. 17; 123/1 A, 196 A, 196 R; 252/10, 58; 184/6.21, 6.24

[56] References Cited

U.S. PATENT DOCUMENTS

| | | | |
|---|---|---|---|
| 3,933,656 | 1/1976 | Reick | 252/25 |
| 4,151,823 | 5/1979 | Grosse et al. | 123/196 |
| 4,349,444 | 9/1982 | Reick | 252/16 |
| 4,507,199 | 3/1985 | Carlisle | 210/238 |
| 4,751,901 | 6/1988 | Moor | 123/196 |
| 4,888,122 | 12/1989 | McCready | 252/25 |
| 5,032,259 | 7/1991 | He et al. | 210/133 |
| 5,070,831 | 12/1991 | Yunick | 123/196 |
| 5,209,842 | 5/1993 | Moor | 210/168 |
| 5,725,031 | 3/1998 | Bilski et al. | 210/DIG. 17 |

*Primary Examiner*—Robert J. Popovics

[57] ABSTRACT

An oil filter (10) includes a colloidal suspension (12) of PTFE particles less than 2 microns in size retained by capillary forces within the intricacies of the filter media (26) until the filter (10) is installed and engine oil flows at first engine start up following installation. The PTFE colloidal suspension (12) is completely and immediately released into the engine lubricating system when oil flow is initiated. The PTFE colloidal suspension (12) is introduced into the oil filter (10) as one of the last manufacturing steps. Oil filter (10) is disposed vertically with its outlet port (14) at the top. A quantity of the PTFE colloidal suspension is introduced into the outlet port (14) to initially fill a portion of the volume defined by a centertube (18) and a retainer (16). The PTFE colloidal suspension passes through openings (20,24) into contact with filter media (26). The capillary forces acting between filter media (26) and the PTFE colloidal suspension (12) cause the colloidal suspension (12) to be drawn in and retained within the intricacies of the filter media (26) fibers.

7 Claims, 2 Drawing Sheets

OIL FILTER TO INTRODUCE ANTI-WEAR ADDITIVES INTO ENGINE LUBRICATING SYSTEM

This application is a division of application Ser. No. 08/691,272, filed Aug. 1, 1996, now U.S. Pat. No. 5,725,031.

BACKGROUND OF THE INVENTION

1. Field of the Invention

This invention relates to an internal combustion engine lubricating system and more particularly to an oil filter for releasing anti-wear additives, such as polytetrafluorethylene, into the lubricating system.

2. Description of Prior Art

The use of polytetrafluoroethylene (PTFE) as a lubricant has been well recognized in industry for many years. More recently a number of products containing PTFE have been introduced into the market place for use as additives in motor oils to reduce wear and friction. U.S. Pat. Nos. 3,933,656 titled "Lubricating Oil with Fluorocarbon Additive" and 4,888,122 titled "Engine Oil Additive Dry Lubricant Powder" are exemplary of engine oil additive prior art.

There are several products commercially available containing PTFE for blending in motor oil. Some trade names of PTFE additive products are Slick 50, T-Plus, and Valvoline VM8. The typical method to introduce PTFE into the engine lubricating system is during a normal oil change to replace one quart of a standard oil product with one quart of a PTFE additive product. The PTFE additive product is dispersed into the engine in the same manner as standard motor oil.

U.S. Pat. No. 5,209,842 titled "Oil Enhancing Multifunction Filter" describes an oil filter to introduce PTFE into an internal combustion engine lubricating system. The filter uses a time release of agglomerated PTFE particles.

SUMMARY OF THE INVENTION

The present invention teaches a unique method of introducing a colloidal suspension of PTFE into the lubricating system of an internal combustion engine from the lubricating system filter. The colloidal suspension comprises PTFE particles of less than 2 microns in size suspended in petroleum oil. A specific quantity of PTFE colloidal suspension is dispensed into the outlet port of a spin on oil filter. The PTFE colloidal suspension then flows through the filters center tube holes and lockseam notch into contact with the filter media which is capable of wicking. The colloidal dispersion of PTFE in oil, when dispensed in contact with the filter media, wicks into the filter media providing a mechanism to hold the dispersion within the intricacies of the filter media fibers. The colloidal suspension remains well dispersed and at the original particle size within the interstices of the filter media. Within the void volume of the filter media the PTFE colloidal suspension is retained by the capillary forces of the filter media pore structure and will not readily leak out. However, when the spin-on filter containing the PTFE colloidal suspension is installed on an internal combustion engine and the engine is started the lubricating system oil flows through the filter and the colloidal suspension is immediately washed out of the filter and introduced into the lubricating system.

BRIEF DESCRIPTION OF DRAWINGS

For a better understanding of the invention reference may be had to the preferred embodiments exemplary of the inventions shown in the accompanying drawings in which.

DETAILED DESCRIPTION OF THE PREFERRED EMBODIMENTS

The present invention can be practiced with typical spin-on full flow type oil filters which are well known in the art. These spin-on oil filters normally have a cylindrical shape with inlet ports and an outlet port on the same end. The outlet flow path is through a center opening connected to a center tube. The inlet ports are disposed around the outlet port. A filter media is positioned in the flow path between the inlet ports and the outlet. The spin-on filter is mechanically attached to and engine and various gaskets and seals are provided to prevent leaks and unwanted oil flow paths.

Figure 1:
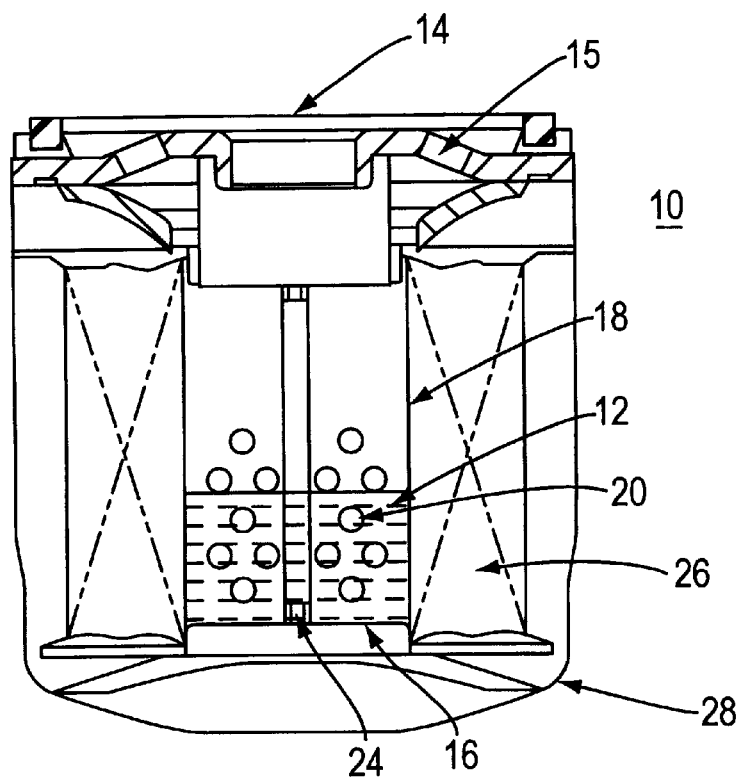
FIG. 1 is a side sectional view of a spin-on oil filter being impregnated with a PTFE colloidal suspension according to the present invention.
Figure 2:
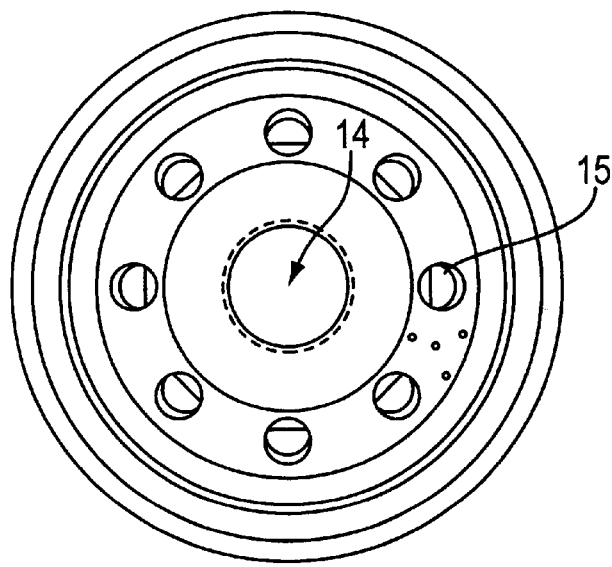
FIG. 2 is a top view of the oil filter shown in FIG. 1.

Referring now to the drawings and FIGS. 1 and 2 in particular there is shown an improved oil filter 10 being impregnated with a PTFE colloidal suspension 12 according to the teaching of the present invention. According to the present invention a colloidal suspension with PTFE particles of less than 2 microns is suspended within the filter media 26 of filter 10 and is immediately released into the engine lubricating system as the oil passes through the filter 10 at first engine start up. The PTFE bonds to metal creating a lasting, micro-thin coating to prevent potential metal to metal contact during start up.

Figure 4:
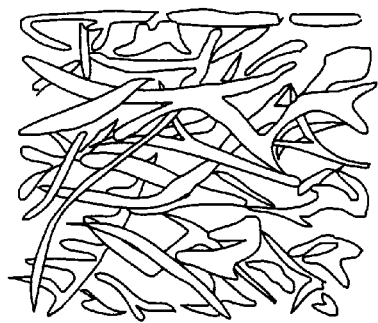

Spin-on oil filter 10 is used to filter out abrasive and sludge contaminants generated during operation of the engine. Filter 10 is cylindrical shaped and has an outer cover 28 and an end with an outlet port 14 and oil inlets 15. When installed filter 10 is attached to an engine with an oil flow path into the inlets 15, through a filter media 26 which is capable of wicking, and out through outlet port 14. The typical filter media 26 used in spin-on oil filter 10 is constructed of various blends of cellulose, glass and synthetic fibers including one or all of the aforementioned fibers, bonded with a synthetic resin. The filter paper or media 26 is manufactured in such a way that the fibers are randomly oriented, as shown in FIG. 4, forming a tortuous path of void volume with various pore sizes. The thickness of filter paper media 26 typically ranges from 0.020 to 0.060 inches.

Within the void volume of the filter media 26 the PTFE colloidal suspension liquid is retained by the capillary forces of the fiber pore structure. The capillary forces are relatively weak, supporting only the mass of the colloidal suspension liquid itself. While the capillary forces are strong enough to prevent the PTFE colloidal suspension liquid from leaking out, if lubricating oil is forced through the filter media 26 containing the colloidal suspension, the PTFE colloidal suspension will be completely washed out of the media pore structure and be displaced by the flowing lubricating oil. If a spin-on oil filter media 26 contains a colloidal suspension of PTFE particles of less than 2 microns in diameter retained within the media pore structure, the PTFE particles are completely released when oil flows through the filter 10.

Various methods can be used to manufacture the spin-on oil filter 10 containing the PTFE colloidal suspension 12. The preferred method is to dispense the PTFE colloidal suspension into the outlet port 14 of the filter with the filter 20 positioned vertically and outlet port 14 at the top. The PTFE colloidal suspension will initially fill a portion of the volume defined by the centertube 18 and the retainer 16, as shown in FIG. 1. As the level of the PTFE colloidal suspension rises in the filter centertube 18 it begins to flow through the centertube holes 20 and centertube notches 24 into contact with the filter media 26. The filter media 26 fabric is folded many times in a convoluted shape around the centertube 18. The convoluted shape creates a large surface area of fabric which can contact the PTFE colloidal suspension. The capillary forces acting between the filter media 26 and the PTFE colloidal suspension 12 cause the PTFE colloidal suspension to be drawn into the filter media 26. The filter media 26 is constructed of cellulose and synthetic fibers randomly formed into a fibrous porous fabric approximately 0.040 inches thick. The fabric has a void volume of approximately 80% formed by the layering and separation of fibers within the fabric. A fluid substance has the opportunity to be retained within this void volume. The amount of PTFE colloidal suspension that can be retained by the filter media 26 is proportional to the total void volume of media and varies dependent on total media volume. For example: With a total media surface area of 100 inches squared and a media thickness of 0.040 inches the total volume encompassing the filter media 26 is 4 cubic inches. If the void volume of the filter media is 80% the available volume to retain a fluid substance such as a PTFE colloidal suspension is 3.2 cubic inches.

Figure 3:
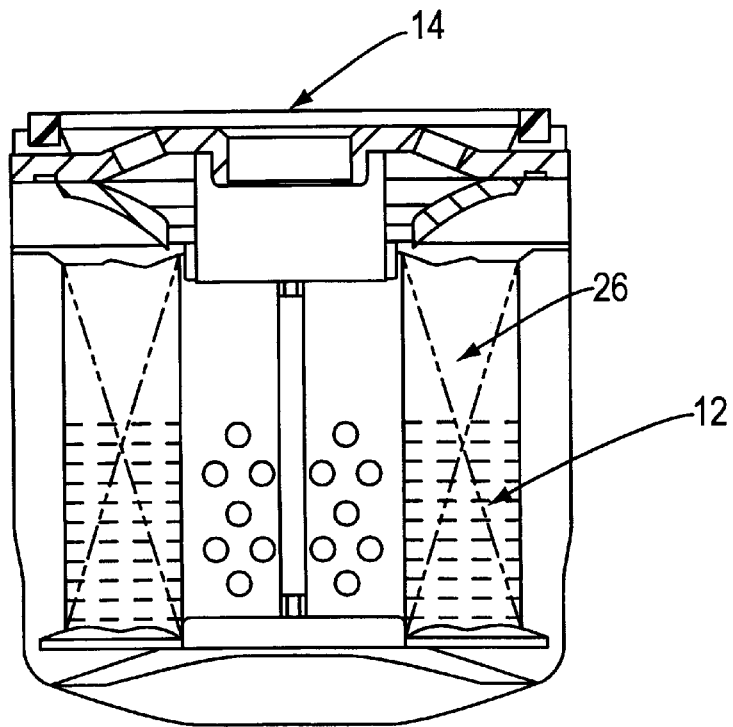
FIG. 3 is a side sectional view of the oil filter of FIG. 1 showing the PTFE colloidal suspension absorbed into the filter media; and, FIG. 4 is an enlarged view of the filter media showing the randomly oriented fibers with various pore sizes and voids.

Because the capillary forces are greater than the forces of gravity acting on the colloidal suspension 12 the colloidal suspension 12 will saturate the filter media 26, as shown in FIG. 3, and rise within the filter media 26 beyond the height of the initial dispense level. In a period of approximately 5 minutes all of the PTFE colloidal suspension liquid 12 is absorbed into the filter media 26 less a thin film on the filter center tube 18 and retainer 16. This allows almost the entire amount of PTFE colloidal suspension to be retained within the filter media 26. A less preferred method to saturate the filter media 26 would be to dispense the colloidal suspension on the filter media 26 during other stages of the filter 10 manufacturing process. A suitable filter media 26 for practicing this invention is used in AlliedSignal's FRAM Extra Guard oil filter.

A suitable PTFE colloidal suspension is SLA-1612 supplied by Acheson Colloids Company. Acheson SLA-1612 contains a 20% solids content of PTFE in a 150 solvent neutral petroleum oil with a dispersing agent. It has a viscosity of 400 cP at 25° C. The size of the PTFE particles suspended in the oil is less than 2 microns in diameter. A stable colloidal suspension such as Acheson SLA-1612 is very suitable for practicing this invention. The size of the PTFE particles are considerably smaller than the pore sizes of the filter media 26 thus they will not become trapped by the filter media 26 when flow is initiated in the engine lubricating system. Also, the PTFE colloidal suspension remains well dispersed so that the less than 2 micron PTFE particles will not agglomerate and become too large and not be able to readily pass through the filter media 26. Additionally the viscosity of the Acheson SLA-1612 liquid is ideal for the capillary action to occur within the filter media 26 allowing the liquid to be completely absorbed within the media pore structure.

The PTFE colloidal suspension 12 can be formulated with a surfactant/coupling agent which promotes bonding of the PTFE to the engine metal surfaces. Also, additives can be utilized to aid in maintaining the PTFE dispersion. Other anti-wear additives can be retained in the filter media intricacies and delivered to the engine lubrication system by the method described in this invention. These additives can be in the form of a colloidal suspension or in solution with a carrier oil. Examples of other anti-wear additives but not inclusive are molybdenum disulfide and graphite. As described above the colloidal dispersion of PTFE in oil when disposed in contact with the filter media 26 wicks into the filter media 26 providing a means to retain the colloidal dispersion 12 within the intricacies of the media fibers. The PTFE colloidal dispersion is completely and immediately released into the engine lubricating system when oil flows during first engine start up after the filter 10 is installed.

We claim:

1. An oil filter for an engine lubricating system comprising:
   an inlet port;
   an outlet port; and,
   a filter media, disposed between said inlet port and said outlet port, formed from a plurality of fibers defining pores through which engine lubricating oil can pass and containing a colloidal suspension of PTFE particles smaller than said pores in size wherein substantially all of said colloidal suspension is retained by capillary forces within the intricacies of the filter media fibers.

2. An oil filter for an engine lubricating system as claimed in claim 1 wherein:
   the particles of the PTFE colloidal suspension are less than 2 microns in size so that they are all released into the engine lubricating system when engine lubricating oil flows during the first engine start up after the engine oil filter is installed.

3. An oil filter for an engine lubricating system as claimed in claim 1 wherein molybdenum disulfide is disposed in the filter media fibers.

4. An oil filter for an engine lubricating system as claimed in claim 1 wherein graphite is disposed in the filter media fibers.

5. A spin-on oil filter for introducing anti-wear additives into an engine lubricating system comprising:
   an inlet;
   an outlet;
   a filter media;
   a centertube having holes formed therein having said filter media disposed around said centertube between said inlet and said outlet with said outlet being in fluid communication with the centertube;
   a quantity of a colloidal suspension of PTFE particles less than 2 microns in size suspended in a petroleum product which is retained by capillary forces within intricacies of said filter media wherein substantially none of the quantity of the PTFE colloidal suspension is present in the centertube.

6. A spin-on oil filter for introducing anti-wear additives into an engine lubricating system comprising:
   a center tube with a volume;
   an inlet;
   an outlet on the same end of the spin-on oil filter as said inlet;
   a filter media formed from a plurality of fibers disposed between said inlet and said outlet with said filter media disposed around said centertube;
   said outlet in fluid communication with said centertube;
   an outer volume surrounding the outside of said filter media;

said inlet in fluid communication with said outer volume;

a limited amount of a colloidal suspension containing PTFE particles of less than 2 microns in size retained within said filter media; and, the entire limited amount of the colloidal suspension containing PTFE particles, which is less than the volume of the centertube, is retained in voids between the filter media fibers wherein substantially none of the colloidal suspension containing PTFE particles is present in either the centertube or the outer volume.

7. A spin-on oil filter for introducing anti-wear additives into an engine lubricating system as claimed in claim 6 wherein additional anti-wear additives are retained along with the PTFE particles in the spin-on oil filter.

* * * * *